(12) United States Patent
Tcha et al.

(10) Patent No.: US 9,413,822 B2
(45) Date of Patent: Aug. 9, 2016

(54) SYSTEM AND METHOD FOR PROVIDING MOBILE P2P SERVICE

(75) Inventors: Yongjoo Tcha, Seongnam-si (KR); Seong-Choon Lee, Seoul (KR)

(73) Assignee: KT Corporation, Seongnam (KR)

( * ) Notice: Subject to any disclaimer, the term of this patent is extended or adjusted under 35 U.S.C. 154(b) by 656 days.

(21) Appl. No.: 13/306,672

(22) Filed: Nov. 29, 2011

(65) Prior Publication Data

US 2012/0136935 A1    May 31, 2012

(30) Foreign Application Priority Data

Nov. 30, 2010    (KR) .................. 10-2010-0120818

(51) Int. Cl.
*G06F 15/16* (2006.01)
*H04L 29/08* (2006.01)
*H04W 36/12* (2009.01)
*H04W 84/22* (2009.01)

(52) U.S. Cl.
CPC ........ *H04L 67/1063* (2013.01); *H04L 67/1093* (2013.01); *H04L 67/2814* (2013.01); *H04W 36/12* (2013.01); *H04W 84/22* (2013.01)

(58) Field of Classification Search
CPC ............... H04L 67/1072; H04L 63/08; H04L 2012/40215; H04L 12/00; H04L 63/0807; H04L 63/101; H04L 63/123; H04L 65/1013; H04L 67/00; H04L 67/02; H04L 67/10; H04L 67/104; H04L 65/1069; H04L 69/329; H04L 67/1063; H04L 63/10; H04L 65/60; H04L 67/2842; G06F 17/30873
USPC ......... 709/203, 204, 212, 216, 217, 219, 227, 709/229, 232
See application file for complete search history.

(56) References Cited

U.S. PATENT DOCUMENTS 7,016,313 B1 * 3/2006 Harper .......................... 370/254
2003/0225892 A1 * 12/2003 Takusagawa et al. ......... 709/227

(Continued)

FOREIGN PATENT DOCUMENTS

KR    1020080022857 A    3/2008
KR    1020090097034 A    9/2009

OTHER PUBLICATIONS

Jung-Suk Han, et al., "Energy-Efficient Routing Protocol for Mobile P2P System using Super Peers", Proceedings of the 29th Korea Information Processing Society (KIPS) Spring Conference, May 2008, pp. 833-836, vol. 15, No. 1. English Abstract.

*Primary Examiner* — Brian J Gillis
*Assistant Examiner* — Thao Duong
(74) *Attorney, Agent, or Firm* — Sughrue Mion, PLLC

(57) ABSTRACT

Mobile P2P system includes mobile tracker node and super peer node. Mobile tracker node is located in dedicated wired network operating in conjunction with internet network to which plurality of peer nodes are connected, and manages information of plurality of mobile peer nodes connected to wireless access network. Peer list containing information on one or more peer nodes having content queried by plurality of mobile peer nodes is transmitted to mobile peer nodes, one or more peer nodes including mobile peer nodes and peer nodes on internet network. Super peer node is connected to mobile tracker node via wires, and located for each wireless access network. Super peer node forwards content query received from mobile peer nodes to the mobile tracker node, and receives the queried content from the peer nodes in the peer list received from the mobile tracker node and transmits the same to the mobile peer nodes.

9 Claims, 10 Drawing Sheets

(56) References Cited

U.S. PATENT DOCUMENTS

| | | | |
|---|---|---|---|
| 2006/0165014 A1* | 7/2006 | Ikeda | 370/254 |
| 2007/0064702 A1* | 3/2007 | Bates et al. | 370/392 |
| 2008/0275952 A1* | 11/2008 | Wang | 709/204 |
| 2009/0265473 A1* | 10/2009 | Hydrie et al. | 709/229 |
| 2010/0049846 A1* | 2/2010 | Ballette et al. | 709/224 |
| 2010/0094876 A1* | 4/2010 | Huang et al. | 707/741 |
| 2011/0246608 A1* | 10/2011 | Wu et al. | 709/217 |

* cited by examiner

SYSTEM AND METHOD FOR PROVIDING MOBILE P2P SERVICE

CROSS-REFERENCE TO RELATED APPLICATION

This application claims priority to and the benefit of Korean Patent Application No. 10-2010-0120818 filed in the Korean Intellectual Property Office on Nov. 30, 2010, the entire contents of which are incorporated herein by reference.

BACKGROUND OF THE INVENTION (a) Field of the Invention

The present invention relates to a system and method for providing a mobile P2P service.

(b) Description of the Related Art

As many people use mobile devices such as cell phones and PDAs nowadays, Peer-to-Peer (hereinafter, 'P2P') networking in mobile environments is getting more and more attention.

The P2P in mobile environments is different from the P2P in fixed environments that has been studied a lot in the past because mobile devices are objects with mobility and each of them has limited communication coverage.

Moreover, as the performance of smartphones has seen much improvement, a wide variety of application services are being delivered. Especially, the demand for large volumes of multimedia traffic is sharply growing.

Meanwhile, distributed service technologies, such as Peer-to-Peer (P2P), are widely used in wired networks in order to accept large volumes of traffic like IPTV, distribute the load of a server, and prevent bottlenecks in a particular network segment.

However, in the case that a distributed service technology such as P2P is applied to wireless networks, it is not appropriate to adapt the technology as it is because wireless link fees imposed on subscribers are high, compared to wired ones, and transfer rates are low and unstable.

The following problem is expected to appear when a mobile P2P service is realized. That is, if a receiving mobile peer is disconnected during movement, or loses its connection because the battery has run out, a transmitting mobile peer will continuously transmit content without knowing about the disconnection while the mobile peer on the other side cannot receive the content, resulting in a loss of the content. However, if the mobile peer resumes its connection later, it will seek retransmission, and the mobile peer on the other side will repeat transmission. Thus, the overload and waste of wireless traffic are expected. Moreover, the probability of such a situation is considerably high, compared to wired links, because wireless links are unstable than the wired ones.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and method for providing a mobile P2P service, which can provide traffic stably in an appropriately distributed fashion, and keep a mobile P2P communication path in its optimum state depending on the movement and status change of a mobile peer.

An exemplary embodiment of the present invention provides a mobile P2P system. This system includes: a mobile tracker node that is located in a dedicated wired network operating in conjunction with an internet network to which a plurality of peer nodes are connected, manages information of a plurality of mobile peer nodes connected to a wireless access network, and transmits, to the mobile peer nodes, a peer list containing information on one or more peer nodes having the content queried by the plurality of mobile peer nodes, the one or more peer nodes including the mobile peer nodes and the peer nodes on the internet network; and a super peer node that is connected to the mobile tracker node via wires, located for each wireless access network, forwards a content query received from the mobile peer nodes to the mobile tracker node, and receives the queried content from the peer nodes in the peer list received from the mobile tracker node and transmits the same to the mobile peer nodes.

Another exemplary embodiment of the present invention provides a mobile P2P service method. This method includes: a mobile tracker node's registering information received from a plurality of mobile peer nodes connected to a wireless access network, the mobile tracker node being located in a dedicated wired network operating in conjunction with an internet network to which a plurality of peer nodes are connected; providing the plurality of mobile peer nodes with information on a super peer node located in the wireless access network and connected via wires to the mobile tracker node; receiving, from the super peer node, a content query transmitted by the plurality of mobile peer nodes; and creating a peer list containing information on one or more peer nodes having the queried content based on the received information, and transmitting the same to the super peer node, the one or more peer nodes including the mobile peer nodes and the peer nodes on the internet network.

Yet another exemplary embodiment of the present invention provides a mobile P2P service method. This method includes: a super peer node's receiving a content query from a plurality of mobile peer nodes and forwarding the same to a mobile tracker node, the super peer node being connected via wires to the mobile tracker located in a dedicated wired network operating in conjunction with an internet network to which a plurality of peer nodes are connected; receiving, from the mobile tracker node, a peer list containing information on one or more peer nodes having the queried content, the one or more peer nodes including the mobile peer nodes and the peer nodes on the internet network; and receiving the queried content from a certain peer node included in the peer list and transmitting the same to the mobile peer nodes.

According to an exemplary embodiment of the present invention, the rapid increase in wireless data traffic caused by the increase in smartphone users in the mobile communication market can be dealth with efficiently by adapting a distributed service technology, such as P2P, to multiple wireless networks.

Moreover, a super peer capable of replacing the function of a mobile peer can be introduced to minimize traffic load in a wireless segment.

Furthermore, a P2P communication path can be optimized by taking into account distance, cost, and wireless node traffic condition.

DETAILED DESCRIPTION OF THE EMBODIMENTS

Figure 1:
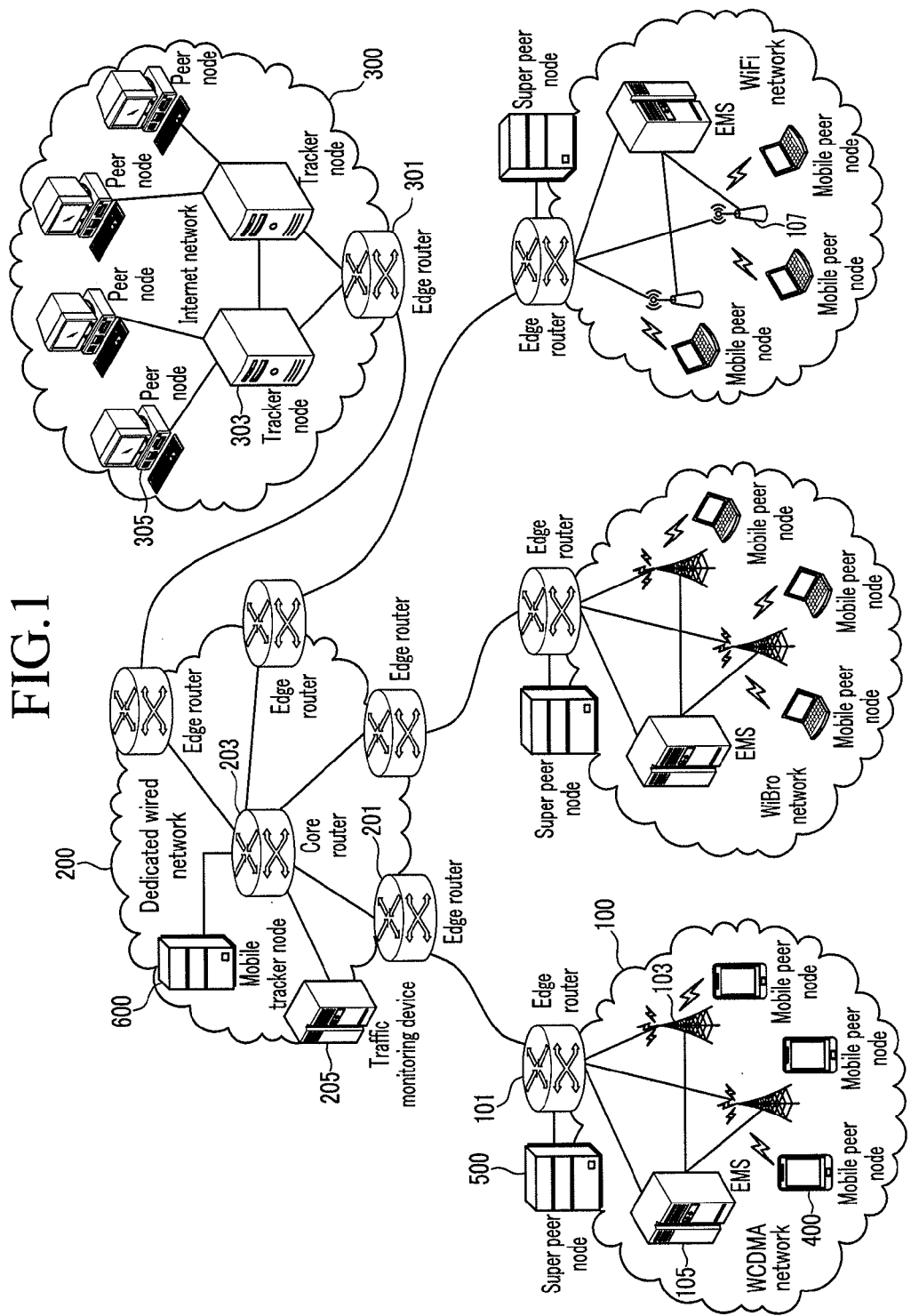
FIG. 1 is a view showing the configuration of networks for providing a mobile P2P service according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

In this specification, a mobile peer node may designate a mobile station (MS), a terminal, a mobile terminal (MT), a subscriber station (SS), a portable subscriber station (PSS), user equipment (UE), an access terminal (AT), and so on. Moreover, the mobile peer node may include all or a part of functions of the mobile terminal, the subscriber station, the portable subscriber station, the user equipment, and so on.

In this specification, a base station (BS) may designate an access point (AP), a radio access station (RAS), a node B (Node B), an evolved node B (eNode B), a base transceiver station (BTS), a mobile multihop relay (MMR)-BS, and so on. Further, the base station may include all or a part of functions of the access point, the radio access station, the node B, the eNode B, the base transceiver station, the MMR-BS, and so on.

Hereinafter, a system and method for providing a mobile P2P service according to an exemplary embodiment of the present invention will be described in detail with reference to the drawings.

FIG. 1 is a view showing the configuration of networks for providing a mobile P2P service according to an exemplary embodiment of the present invention.

Referring to FIG. 1, the networks for providing a mobile P2P service include wireless access networks 100, a dedicated wired network 200, and an internet network 300.

The wireless access networks 100, which are connected to a mobile peer node 400, include, for example, a WCDMA (Wideband Code Division Multiple Access) network, a WiBro network, and a WiFi network.

Such a wireless access network 100 includes an edge router 101, and is connected to the dedicated wired network 200 through the edge router 101. The edge router 101 serves to interconnect the wireless access network 100, to which it belongs, to the dedicated wired network 200.

The dedicated wired network 200 includes edge routers 201 and a core router 203. The edge routers 201 are connected to the edge router 101 of each wireless access network 100 and the core router 203 to connect the wireless access networks 100 and the dedicated wired network 200. Further, the core router 203 is connected to an edge router 301 of the internet network 300 to connect the wireless access networks 100 and the internet network 300.

At this time, a traffic monitoring device 205 is connected to the core router 203 to collect traffic information.

Moreover, the internet network 300 includes the edge router 301 connected to the edge router 201 of the dedicated wired network 200, and the edge router 301 is connected to a tracker node 303. The tracker node 303 collects information of peer nodes 305 and provides a peer list.

Among the wireless access networks 100, the WCDMA network and the to WiBro network each include a base station 103 and an EMS (Element Management System) 105.

The EMS 105 remotely monitors and controls information of IP (Internet Protocol) equipment, for example, the base station 103, to collect traffic information of the base station 103 and transmit it to the traffic monitoring device 205 of the dedicated wired network 200 through the edge router 101.

Among the wireless access networks 100, the WiFi network includes an access point (AP) 107. The access point 107 transmits traffic information to the traffic monitoring device 205 through the edge router 101.

At this point, the wireless access networks 100 are connected to one or more mobile peer nodes 400.

The mobile peer nodes 400 are handheld mobile terminals, such as cell phones, PDAs (Personal Digital Assistants), smartphones, laptops, and iPads.

Such a mobile peer node 400 includes the Content Upload Function (CUF) for sending content and the Content Download Function (CDF) for receiving content.

A virtual server, i.e., super peer node 500, which replaces the function of the mobile peer node 400, is located in each wireless access network 100.

Such a super peer node 500 in the form of a virtual server is fixedly located at the boundary of the wireless access network 100, and connected to the dedicated wired network 200 via wires. Also, the super peer node 500 receives content in place of the mobile peer node 400 and transmits it to the mobile peer node 400, and registers a content list of the mobile peer node 400 to a mobile tracker node 600.

In a mobile P2P environment, a peer list may be frequently updated according to the movement and status changes of the mobile peer nodes 400. With these changes in the mobile peer nodes 400, frequent control messages may be generated between the mobile peer nodes 400 and the mobile tracker node 600. To reduce such status changes, the super peer node 500 replacing the function of the mobile peer nodes 400 is located at a boundary end point of the wireless access network 100 so as to be connected to the dedicated wired network 200 via wires.

As the super peer node 500 can receive and forward the content of the mobile peer nodes 400 in place of the mobile peer nodes 400, the received content can be re-transmitted later to the mobile peer nodes 400 even under a situation where no content cannot be received because the mobile peer nodes 400 are disconnected or the battery runs out, thereby preventing the problem of content loss.

Further, the dedicated wired network 200 includes a mobile tracker node 600 connected to the core router 203. Like the tracker node 303 of the internet network 300, the mobile tracker node 600 provides a peer list by collecting information of the mobile peer nodes 400. That is, the mobile tracker node 600 provides a list of the mobile peer nodes 400 where the content requested by the mobile peer nodes 400 can be downloaded.

At this point, the super peer node 500 and the mobile tracker node 600 can be implemented in the form of a large-capacity server.

Now, detailed configurations of the super peer node 500 and the mobile tracker node 600 will be described with reference to FIGS. 2 and 3.

Figure 2:
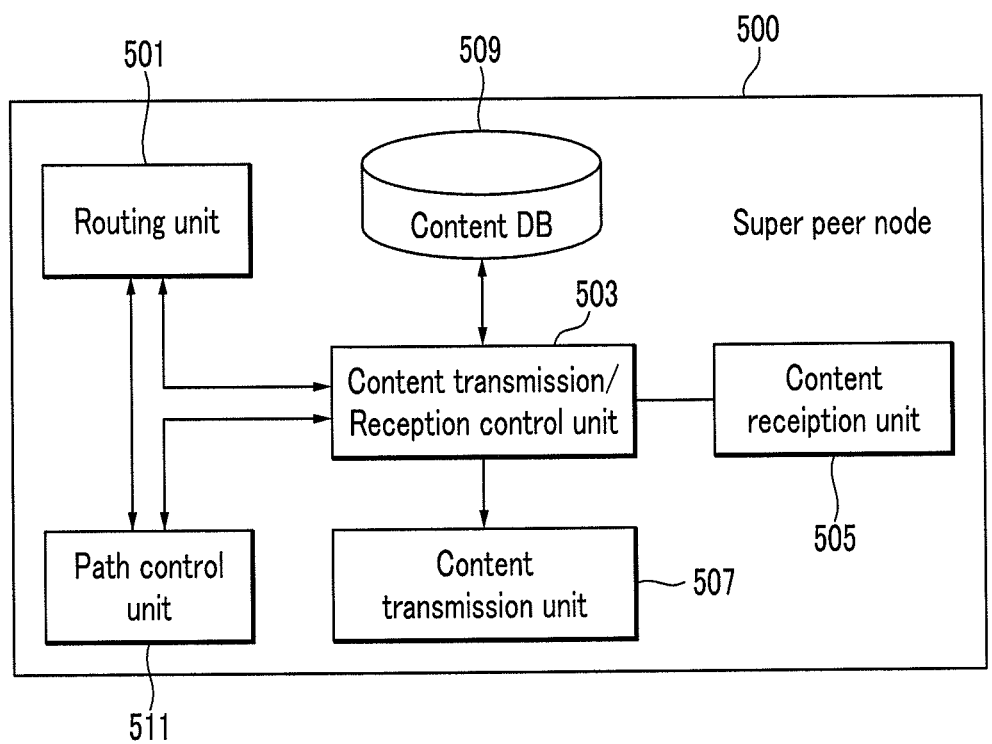
FIG. 2 is a block diagram showing the configuration of a super peer node according to an exemplary embodiment of the present invention.

FIG. 2 is a block diagram showing the configuration of a super peer node according to an exemplary embodiment of the present invention.

Referring to FIG. 2, the super peer node 500 includes a routing unit 501, a content transmission/reception control unit 503, a content reception unit 505, a content transmission unit 507, a content DB 509, and a path control unit 511.

The routing unit 501 receives 'peer registration' and 'content query' from the mobile peer nodes 400, and routes them to the mobile tracker node 600.

The content transmission/reception control unit 503 receives a peer list from the mobile tracker node 600.

The peer node contains information on peer nodes having the content, and includes information on content transmission priority of the peer nodes. Hereinbelow, the peer nodes having the content and included the peer list are commonly referred to as 'content transmission peers'.

Such content transmission peers include peer nodes 305 located in the internet network 300, the mobile peer nodes 400 located in the wireless access network 100 to which the mobile peer node 400 that has transmitted content query belongs, and mobile peer nodes 400 located in a different wireless access network 100. Although described later, the super peer node 500 has the content storage function. Thus, the content transmission peers also include the super peer node 500 of the wireless access network 100 to which the mobile peer node 400 that has transmitted content query belongs, and the super peer node 500 of a different wireless access network 100.

The content transmission/reception unit 503 sends a content request to the content transmission peer with the highest priority among the content transmission peers listed in the peer list, and transmits the content to the mobile peer node 400 that has transmitted the content query.

If there is pre-stored content in the content DB 509, the stored content can be transmitted to the mobile peer node 400 that has transmitted the content query.

Moreover, if a content storage request is received from the mobile tracker node 600 during reception of the content from the content transmission peer, content transmission to the mobile peer node 400 that has transmitted the content query is stopped, and the received content is stored in the content DB 509. Of course, if a content transmission request is received later from the mobile tracker node 600, content transmission is resumed, and the content stored in the content DB 509 is transmitted to the mobile peer node 400 that has transmitted the content query.

The content reception unit 505 downloads the content from the content transmission peer under control of the content transmission/reception control unit 503, and can be implemented as a large-capacity buffer.

The content transmission unit 507 transmits the content received by the content reception unit 505 or the content stored in the content DB 509 to the mobile peer node 400 that has transmitted the content query under control of the content transmission/reception control unit 503.

The content DB 509 stores the content received by the content reception unit 505 under control of the content transmission/reception unit 503.

Upon receipt of a super peer handover request from the mobile tracker node 600, the path control unit 511 performs super peer handover to a different super peer node 500 or mobile peer node 400 based on the information contained in the super peer handover request. As used herein, the super peer handover is defined as an 'operation for handing over the content transmission rights'.

During the super peer handover, information on the mobile peer node 400 that is currently transmitting the content can be transmitted together with the content already received by the content reception unit 505.

Figure 3:
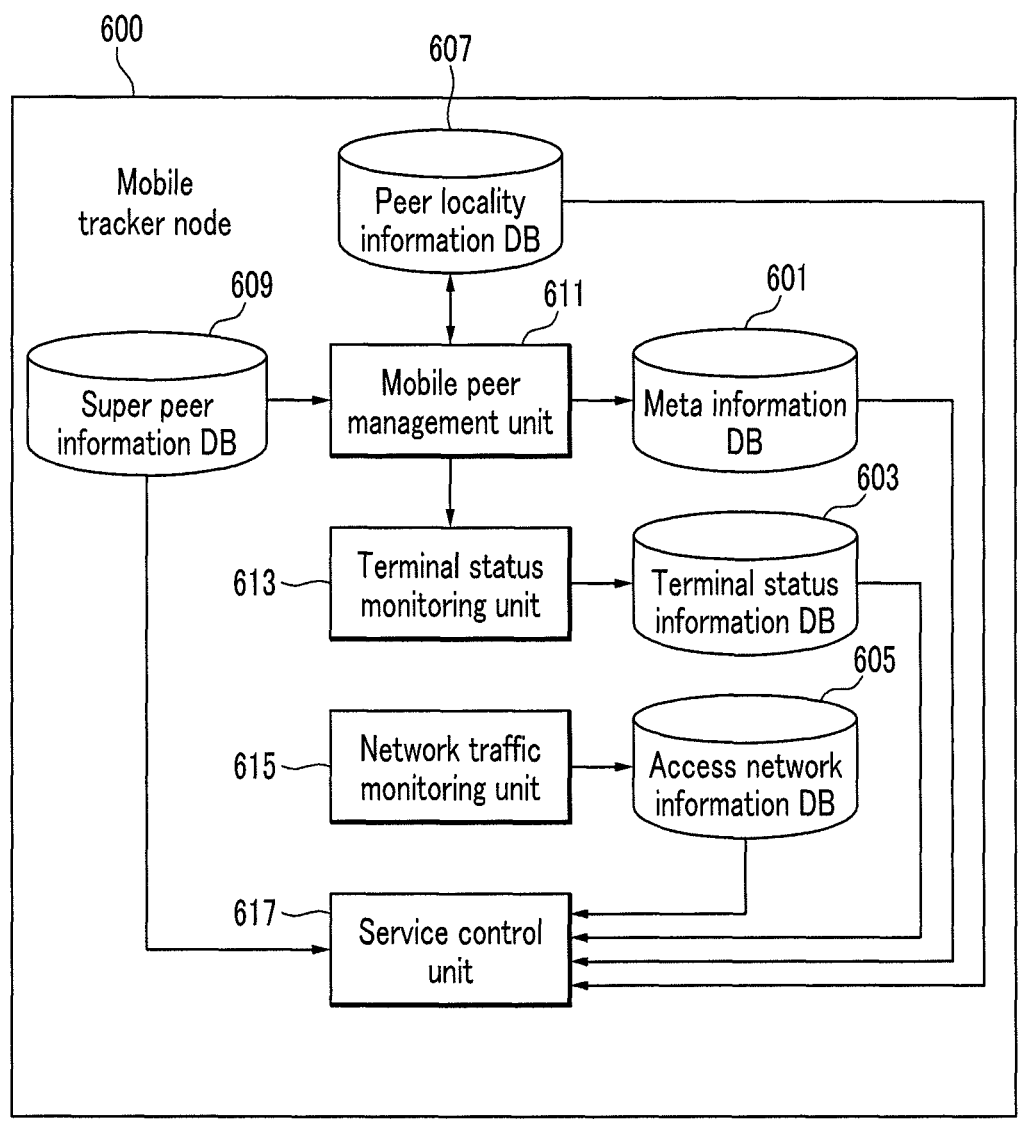
FIG. 3 is a block diagram showing the configuration of a mobile tracker to node according to an exemplary embodiment of the present invention.

FIG. 3 is a block diagram showing the configuration of a mobile tracker node according to an exemplary embodiment of the present invention.

Referring to FIG. 3, the mobile tracker node 600 includes a meta information DB 601, a terminal status information DB 603, an access network traffic information DB 605, a peer locality information DB 607, a super peer information DB 609, a mobile peer management unit 611, a terminal status monitoring unit 613, a network traffic monitoring unit 615, and a service control unit 617.

The meta information DB 601 stores user content information, i.e., meta information. Such meta information includes a list of content for each mobile peer node 400 received from the mobile peer nodes 400.

Moreover, the meta information includes content path information provided for each mobile peer node 400.

Other meta information includes a variety of information related to mobile P2P content, such as mobile P2P service subscription information, connection quality information of mobile P2P service, upload speed information, download speed information, number of existing peer connections, amount of available peer content, historical peer behavior information, forecast peer behavior information, local resources, type of internet address, and node accessibility, predicted pairwise connectivity.

The terminal status information DB 603 stores information related to the terminal status of the mobile peer nodes 400. In other words, it stores terminal status change information, such as Power On/Off, terminal performance information of the mobile peer nodes 400, and information about the connection status of the mobile peer nodes 400 to the access network 100.

The access network information DB 605 stores information about the nodes constituting the access network 100. These nodes include an edge router 101, a switch (not shown), a super pier node 500, a base station 103, ACR (Access Control Router) for a Wibro network, and SGSN (Serving GPRS Support Node) and GGSN (GPRS Gateway Support Node) for a WCDMA network.

Moreover, the access network information DB 605 stores information about the traffic information of each cell, i.e., load information indicating the traffic conditions of a base station 103 and an access point 107.

The peer locality information DB 607 stores the type of a wireless access network 100 to which a mobile peer node 400 is connected, information about a connected cell, and real-time location information. Such locality information includes internet protocol addresses, network coordinate system information, internet protocol address to geolocation database results, information about whether peers are in a public or a private network region, postal address information, and global positioning system information.

The super peer information DB 609 includes location information of each of the super peer nodes 500 located in the wireless access networks 100, server information, and so on.

Moreover, the super peer information DB 609 stores mapping information between the mobile peer node 400 and the super peer node 500 of the wireless access network 100 to which the mobile peer node 400 is connected. A mapping between the mobile peer node 400 and the super peer node 500 functions to suppress traffic on a wireless interface that is unnecessarily generated from the mobile peer node 400. Further, a client mobile peer requesting a service continuously performs a relay function through the super peer even if communication is cut off due to changes in the wireless environment, thereby enhancing service continuity and the mobility of the mobile peer.

The mobile peer management unit 611 performs the meta information processing function (MIPF) for managing content information of the mobile peer node 400. The mobile peer management unit 611 performs peer registration of the mobile peer node 400, and updates content information received from the mobile peer node 400 in the meta information DB 601.

At this point, the mobile peer management unit 611 receives, from the super peer node 500, the peer registration transmitted by the mobile peer node 400.

The terminal status monitoring unit 613 performs the user equipment status monitoring function (UEMF) for managing the status of the mobile peer node 400. The terminal status monitoring unit 613 operates in conjunction with the wireless access network 100 to which the mobile peer node 400 is connected so as to monitor the power on/off, connection status, etc. of the mobile peer node 400, and updates the monitoring result to the terminal status information DB 603.

In this case, the terminal status monitoring unit 613 can periodically receive terminal status information of the mobile peer node 400 through the mobile peer node 400 or through the super peer node 500. Alternatively, it can receive terminal status information of the mobile peer node 400 through the base station 103 or access point 107 of the wireless access network 100 to which the mobile peer node 400 is connected.

The network traffic monitoring unit 615 performs the access network traffic monitoring function (ATMF) for monitoring the traffic condition of the wireless access network 100. The network traffic monitoring unit 615 collects, from the traffic monitoring device 205, base station load information of the wireless access network 100 collected by the traffic monitoring device 205, and updates it in the access network information DB 605.

The service control unit 617 performs the mobile P2P service control function (MPSF).

That is, the service control unit 617 receives, from the mobile peer node 400, a content query for requesting a content download, and searches the meta information DB 601 and provides the mobile peer node 400 with a peer list containing information about peers from which the content can be downloaded.

Unlike P2P in a wired (fixed) network, in a mobile P2P network, the peer list is created by selecting content transmission peers, taking into account the to following criteria:

① terminal mobility
② terminal status change (Power On, Off)
③ abrupt change in connection quality (i.e., it is difficult to ensure QoS due to variations in transmission rate)
④ Terminal performance is lower than computer performance in wired (fixed) network
⑤ High fees to be charged for connecting links
⑤ Billing for transmission as well as for reception Moreover, the service control unit 617 determines an optimum peer list by analyzing network traffic information of the content transmission peers based on the information obtained from searching of the terminal status information DB 603 and the access network traffic information DB 605.

In other words, network traffic information including the types of connected networks of the content transmission peers and the load of connected cells are analyzed so that any content transmission peer belonging to a base station 103 or access point 107 with heavy traffic should not be included in the peer list.

The service control unit 617 can select content transmission peers according to the following order of content transmission priority, which may differ more or less depending on the type of the wireless access network 100.

For example, if the wireless access network 100 to which the mobile peer node 400 requesting a content query is connected is a WCDMA network, content transmission peers are selected according to the following order of to content transmission priority shown in Table 1.

TABLE 1

| Priority order | object |
| --- | --- |
| 1 | Super peer on WCDMA network |
| 2 | Peer connected to wired network or super peer on other network |
| 3 | Mobile peer connected to WiFi |
| 4 | Mobile peer connected to Wibro with light load (less than 40%) on base station |
| 5 | Mobile peer connected to WCDMA with little load (less than 10%) on base station |
| 6 | Mobile peer connected to WiBro with bearable load (less than 70%) on base station |
| 7 | Mobile peer connected WCDMA with bearable load (less than 50%) on base station |

Moreover, if the wireless access network 100 to which the mobile peer node 400 requesting a content query is connected is a WiFi network, content transmission peers are selected according to the following order of content transmission priority shown in Table 2.

TABLE 2

| Priority order | object |
| --- | --- |
| 1 | WiFi mobile peer that can constitute AD hoc network |
| 2 | Super peer on WiFi network |
| 3 | Peer connected to wired network or super peer on other network |
| 4 | WiFi-connected mobile peer that cannot constitute AD hoc network |
| 5 | Mobile peer connected to Wibro with light load (less than 40%) on base station |
| 6 | Mobile peer connected to WCDMA with little load (less than 10%) on base station |

TABLE 2-continued

| Priority order | object |
|---|---|
| 7 | Mobile peer connected to WiBro with bearable load (less than 70%) on base station |
| 8 | Mobile peer connected WCDMA with bearable load (less than 50%) on base station |

Further, as a result of searching the terminal status information DB 603 and the super peer information DB 609, if it is determined that the mobile peer node 400 is in a content unreceivable state due to the power off of the mobile peer node 400 or the disconnection of the wireless access network 100, a request is sent to the super peer node 500 mapped to the current mobile peer node 400 to stop content transmission to the mobile peer node 400 and store the content being transmitted. Next, when the mobile peer node 400 goes back into the content receivable state, a request is sent to the super peer node 500 to transmit the stored content to the mobile peer node 400.

In addition, as a result of searching the peer locality information DB 607, if it is determined that the mobile peer node 400 has moved, the service control unit 617 configures an optimum P2P transmission path by taking into account the traffic load, cost, etc. of the wireless access network 100 to which the mobile peer node 400 is connected, based on the information obtained from searching of the access network traffic information DB 605.

Next, a method for providing a mobile P2P service will be described based on the above-explained configuration of FIGS. 1 to 3.

Like components to those of FIGS. 1 through 3 are indicated with like reference numerals of FIGS. 1 through 3.

Figure 4:
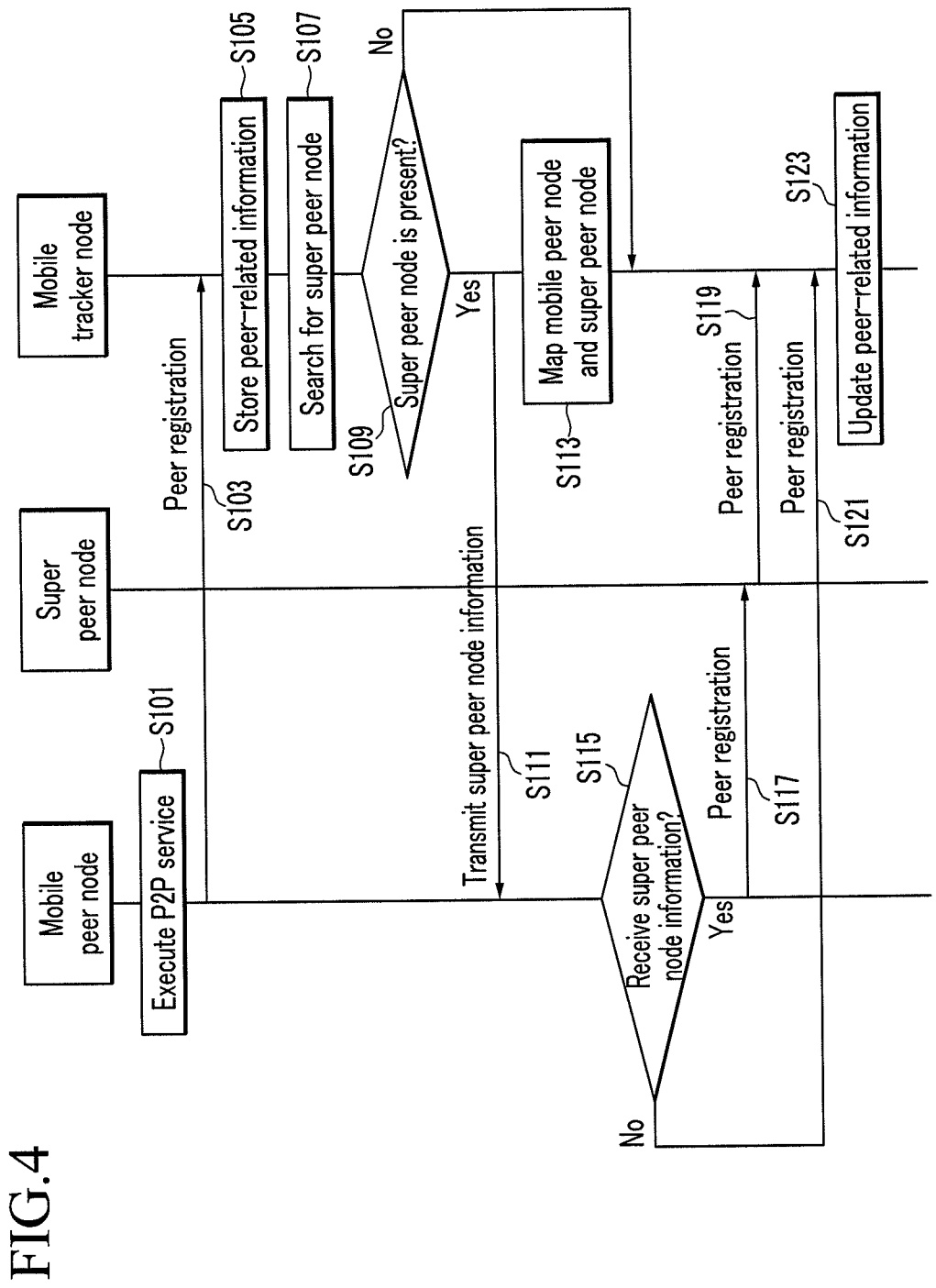
FIG. 4 is a flowchart showing a peer registration process of a mobile peer node according to an exemplary embodiment of the present invention.

First, FIG. 4 is a flowchart showing a peer registration process of a mobile peer node according to an exemplary embodiment of the present invention.

Referring to FIG. 4, the mobile peer node 400 connected to a certain wireless access network 100 executes a mobile P2P service (S201). This involves executing a process in which a user sends a request to use the mobile P2P service and all the relevant operations are carried out.

Then, the mobile peer node 400 is connected to the mobile tracker node 600 and performs peer registration (S203). As the connection is an initial connection to the mobile tracker node 600, the peer registration is transmitted to the mobile tracker node 600.

The peer registration is an operation of reporting peer-related information defined in the mobile P2P service to the mobile tracker node 600 periodically or on every change in the information on the content the mobile peer node 400 has. Also, the peer-related information can include information on the content the mobile peer node 400 has, terminal performance information, information about the connected access network, current location information, and so on.

Meanwhile, the mobile peer management unit 611 of the mobile tracker node 600 stores the peer-related information received from the mobile peer node 400 in the peer registration step S203 (S105).

Next, the mobile peer management unit 611 of the mobile tracker node 600 searches the super peer information DB 609 for the super peer node located in the wireless access network 100 to which the mobile peer node 400 is connected (S107), and determines whether the super peer node 500 is present or not (S109).

As a result of the search, if the super peer node 500 is present, information about the searched super peer node 500 is transmitted to the mobile peer node 400 (S111). Then, the mobile peer node 400 and the super peer node 500 are mapped and stored in the super peer information DB 609 (S113).

Afterwards, when the time for peer registration arrives, the mobile peer node 400 determines whether super peer node information has been received from the mobile tracker node 600 or not (S115).

If the super peer node information has been received, the mobile peer node 400 performs peer registration to the super peer node 500 (S117). Then, the super peer node 500 forwards the peer registration to the mobile tracker node 600 (S119).

On the other hand, if it is determined in the step S115 that no super peer node information has been received, the mobile peer node 400 performs peer registration to the mobile tracker node 600 (S121).

The mobile tracker node 600 updates the peer-related information received in the step S119 or the step S121 (S123).

Figure 5:
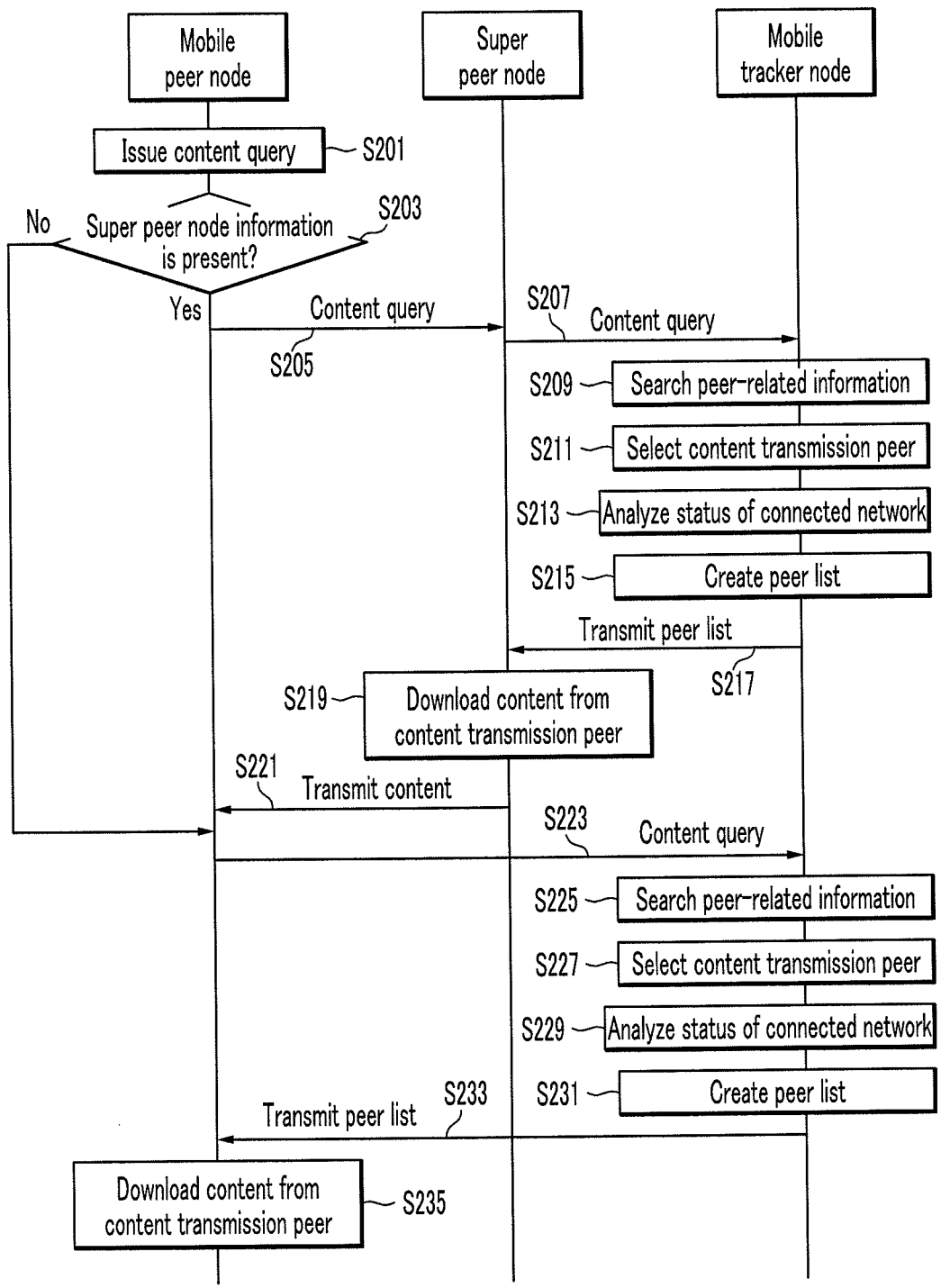
FIG. 5 is a flowchart showing a P2P content transmission process according to an exemplary embodiment of the present invention.

FIG. 5 is a flowchart showing a P2P content transmission process according to an exemplary embodiment of the present invention.

Referring to FIG. 5, when a P2P content query requested by the user is issued (S201), the mobile peer node 400 determines whether there exists super peer node information of the connected wireless access network 100 (S203). That is, it is determined whether ther super peer node information received upon registration of FIG. 4 is stored or not.

If there exists super peer node information, the content query is transmitted to the super peer node 500 (S205). Then, the routing unit 501 of the super peer node 500 routes the content query to the mobile tracker node 600 (S207).

Next, the service control unit 617 of the mobile tracker node 600 searches the meta information DB 601 for peer-related information (S209), and selects one or more content transmission peers having the content queried in the step S207 (S211). These content transmission peers include the mobile peer node 400, a super peer node 500, and the peer node 305 of the internet network 300.

Moreover, the service control unit 617 of the mobile tracker node 600 analyzes the status of a network to which a content transmission peer is connected by searching the access network traffic information DB 605 and the peer locality information DB 607 (S213).

In other words, if the content transmission peer is the mobile peer node 400 or the super peer node 500, base station (or cell) load information of the wireless access network 100 stored in the access network traffic information DB 605 is checked.

Also, if the content transmission peer is the peer node 305 of the internet network 300, the tracker node 303 of the internet network 300 is requested to check network load information.

The service control unit 617 of the mobile tracker node 600 creates a peer list consisting of one or more content transmission peers that meet a defined order of content transmission priority as an analysis result of the connected network status obtained in the step S213, among one or more content transmission peers selected in the step S211 (S215). That is, any content transmission peer not included in the orders of content transmission priority of Tables 1 and 2 is not included in the peer list.

Once the peer list is created (S215), the service control unit 617 of the mobile tracker node 600 transmits the peer list to the super peer node 500 (S217). The peer list includes an order of content transmission priority.

Afterwards, the content transmission/reception control unit 507 of the super peer node 500 sends a content download request to the content transmission peer with the highest priority according to the peer list received in the step S217, and the content reception unit 505 of the super peer node 500 downloads the content (S219). Next, the content transmission unit 507 of the to super peer node 500 transmits the content downloaded in the step S219 to the mobile peer node 400 (S221).

On the other hand, if the mobile peer node 400 determines in the step S203 that there exists no super peer node information, i.e., the super peer node 500 is not present in the wireless access network 100 to which the mobile peer node 400 is connected, a content query is transmitted to the mobile tracker node 600 (S223).

The service control unit 617 of the mobile tracker node 600 searches the metal information DB 601 (S225), and selects one or more content transmission peers having the queried content (S227). Then, the connected network status is analyzed (S229) to create a peer list consisting of optimum content transmission peers that meet the order of content transmission prirotiy (S231), and the created peer list is transmitted to the mobile peer node 400 (S233). Here, the steps S225 to S231 are identical to the steps S209 to S215.

Meanwhile, the mobile peer node 400 sends a content request to the content transmission peer with the highest priority among the content transmission peers included in the peer list received in the step S233, and receives the content (S235).

Figure 6:
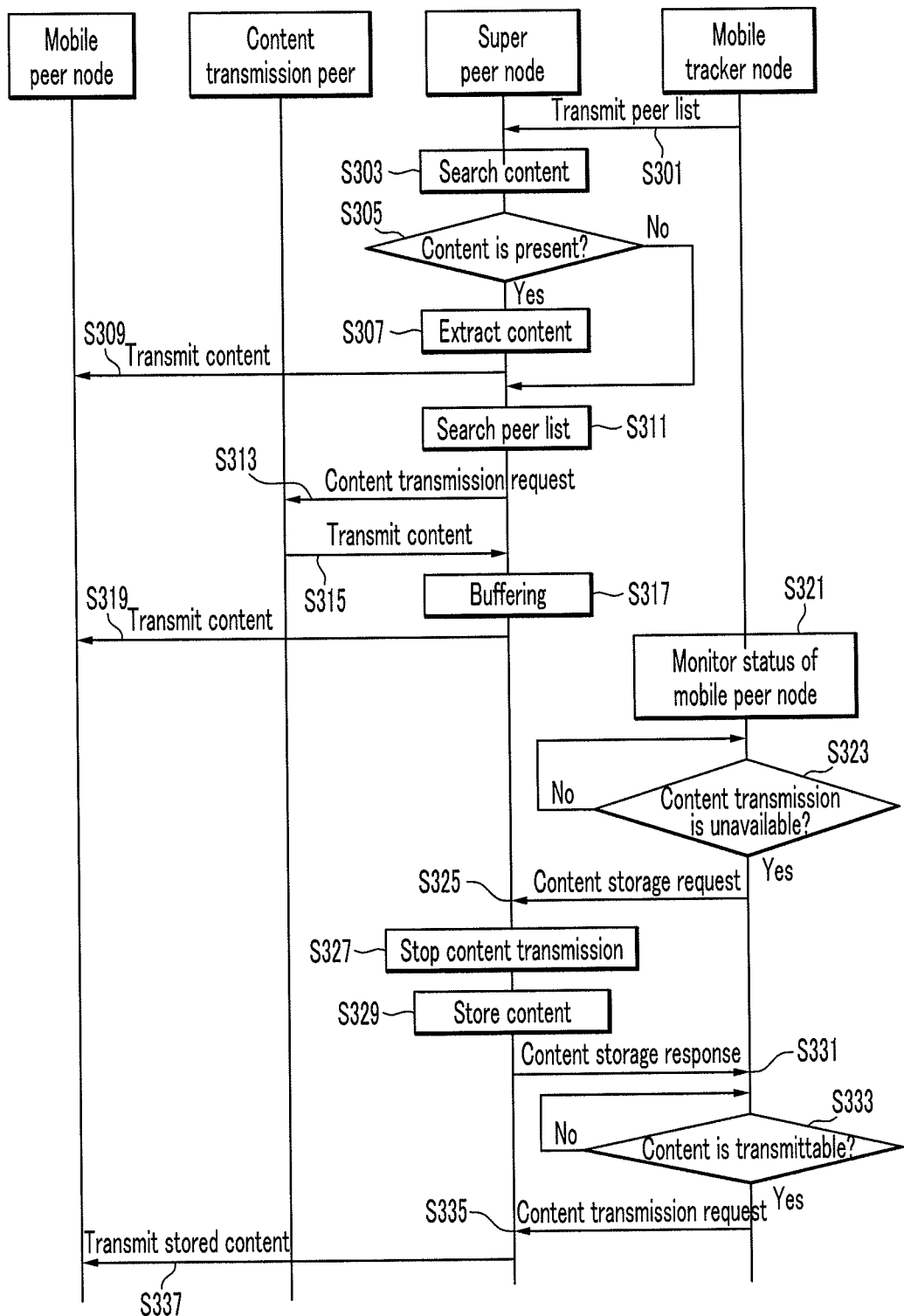
FIG. 6 is a flowchart showing in details a P2P content transmission operation of the super peer node according to an exemplary embodiment of the present invention.

FIG. 6 is a flowchart showing in details a P2P content transmission operation of the super peer node according to an exemplary embodiment of the present invention.

Referring to FIG. 6, the content transmission/reception control unit 503 of the super peer node 500 that has received the peer list from the mobile tracker node 600 searches the content DB 509 (S303), and determines whether the content queried by the mobile peer node 400 is stored or not (S305).

If the content has been stored, the content transmission/reception control unit 503 of the super peer node 500 extracts the stored content from the content DB 509 (S307), and transmits it to the mobile peer node 400 (S309).

Otherwise, if the content is determined not to have been stored, the content transmission/reception control unit 503 of the super peer node 500 searches the peer list received in the step S301 (S311), and sends a content transmission request to the content transmission peer (not shown) with the highest priority (S313). Then, the content transmission unit 505 of the super peer node 500 receives the content from the content transmission peer (not shown) (S315), and the content transmission unit 507 of the super peer node 500 transmits the content being buffered (S317) to the mobile peer node 400 (S319).

In the case of failing to receive the content in the step S315, the content transmission/reception control unit 503 of the super peer node 500 sends a content transmission request to the content transmission peer (not shown) with the next highest priority included in the peer list and receives the content.

Meanwhile, the terminal status monitoring unit 613 of the mobile tracker node 600 monitors the status of the mobile peer node 400 (S321). Then, a monitoring result is stored in the terminal status information DB 603. The monitoring method may involve receiving terminal status information periodically from the base station 103, the EMS 105, and the wireless access point 107. Alternatively, the terminal status information may be received from the mobile peer node 400 if the mobile peer node 400 has performed peer to registration.

At this point, the service control unit 617 of the mobile tracker node 600 determines if content transmission to the mobile peer node 400 is not available by referring to the terminal status information DB 603 (S323). For example, it is determined if the mobile peer node 400 is powered off or has a wireless network connection error.

If it is determined that content transmission to the mobile peer node 400 is not available in the step S323, the service control unit 617 of the mobile tracker node 600 sends a content storage request to the super peer node 500 (S325).

Next, the content transmission/reception control unit 503 of the super peer node 500 stops content transmission to the mobile peer node 400 (S327), and stores the content received from the content transmission peer (not shown) in the content DB 509 (S329). Then, a content storage response is transmitted to the service control unit 617 of the mobile tracker node 600 (S331).

Afterwards, the service control unit 617 of the mobile tracker node 600 determines the availability of content transmission while continuously monitoring the terminal status of the mobile peer node 400 by referring to the terminal status information DB 603 (S333).

If content transmission is available, the service control unit 617 of the mobile tracker node 600 sends a content transmission request to the super peer node 500 (S335).

Then, the content transmission/reception control unit 503 of the super peer node 500 resumes content transmission and transmits the content stored in the content DB 509 in the step S329 to the mobile peer node 400 (S337).

In what follows, FIGS. 7 through 10 illustrate various exemplary embodiments of the process in which the mobile P2P content transmission path is changed when the mobile peer node moves, i.e., the method in which the content transmission path is controlled.

Figure 7:
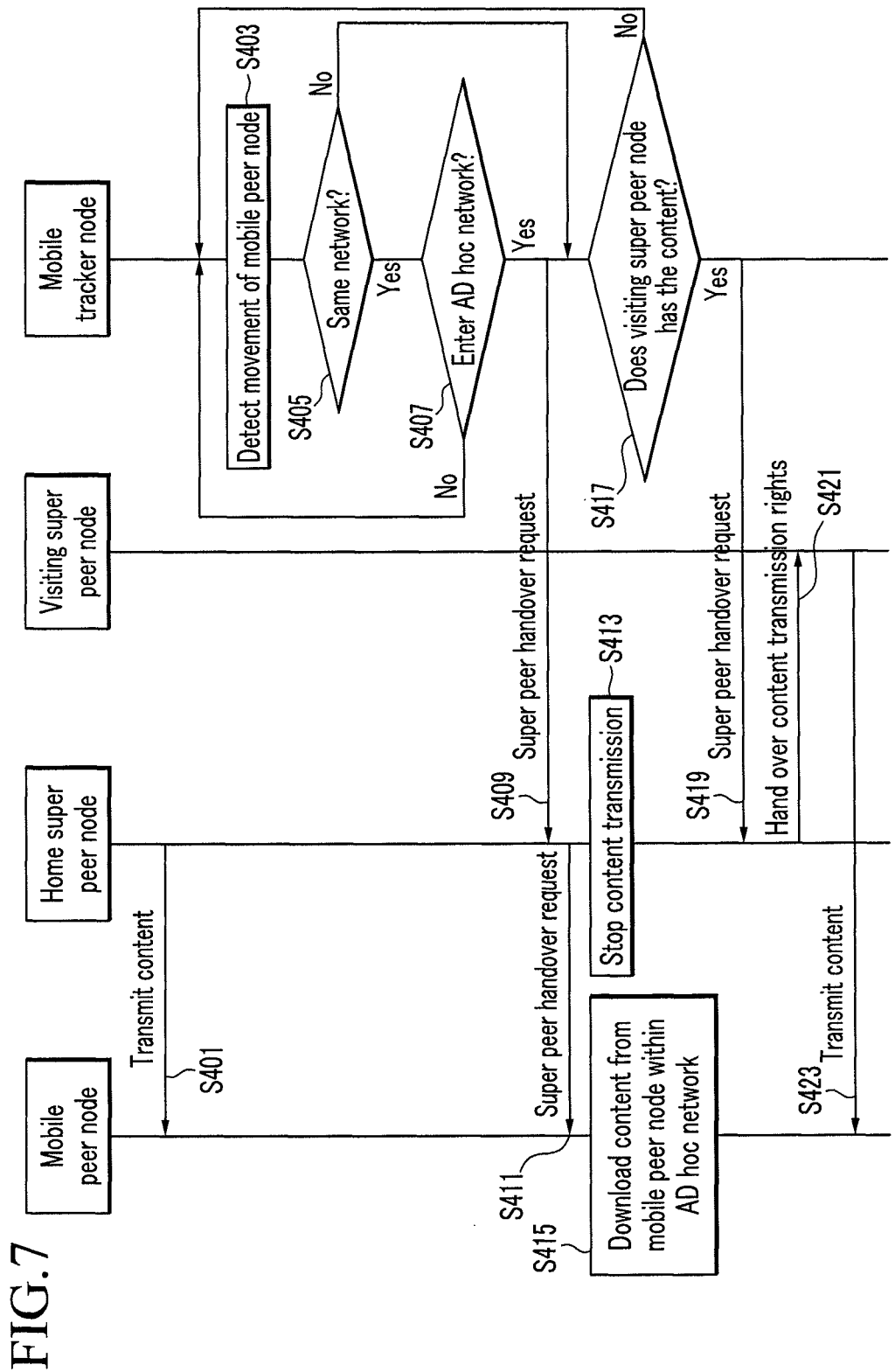
FIG. 7 is a flowchart showing a method for controlling a content transmission path according to one exemplary embodiment of the present invention.

First, FIG. 7 is a flowchart showing a method for controlling a content transmission path according to one exemplary embodiment of the present invention.

As used herein, a home super peer node 500 means a super peer node located in a wireless access network 100 to which a mobile peer node 400 has been previously connected, and a visiting peer node 500 means a super peer node located in a wireless access network 100 to which the mobile peer node 400 has moved.

Referring to FIG. 7, if the mobile peer node 400 moves while receiving content from the home super peer node 500 (S401), the peer locality information DB 607 is updated, and the service control unit 617 of the mobile tracker node 600 detects the movement of the mobile peer node 400 (S403).

At this point, the service control unit 617 of the mobile tracker node 600 determines if the mobile peer node 400 is moving within the same network (S405). That is, it is determined a cell change occurs within the same network.

When the mobile peer node 400 is detected as moving within the same network, the service control unit 617 of the mobile tracker node 600 determines if the mobile peer node 400 is moving to an AD hoc network having the content the mobile peer node 400 is receiving (S407). That is, it is determined whether to the mobile peer node 400 is entering the AD hoc network or not.

If the mobile peer node 400 has not moved to the AD hoc network, no operation is carried out at all, and the step S403 is performed again.

On the contrary, if the mobile peer node 400 has moved to the AD hoc network, the service control unit 617 of the mobile tracker node 600 sends the home super peer node 500 a request to perform super peer handover to the mobile peer node 400 in the AD hoc network (S409). At this point, information of the mobile peer node in the AD hoc network is transmitted as well.

Then, the home super peer node 500 forwards the super peer handover request to the content receiving mobile peer node 400 (S411), and stops the content transmission (S413).

The mobile peer node 400 sends a content download request to the mobile peer node 400, present in the AD hoc network and requested to take over the super peer in the step S411, and receives the content (S415).

On the other hand, if it is determined in the step S405 that the mobile peer node 400 has moved not within the same network but to a different network, the service control unit 617 of the mobile tracker node 600 determines whether the visiting super peer node 500 has the content being received by the mobile peer node 400 (S417). A list of content that the visiting super peer node has is obtained through a content storage response in the step S331 of FIG. 6, and stored in the super peer information DB 609. Accordingly, the service control unit 617 of the mobile tracker node 600 searches the super peer information DB 609 to check the content of the visiting super peer node 500.

In the step S417, if the visiting super peer node 500 is determined as having no content, the flow returns to the step S403.

Otherwise, if the visiting super peer node 500 is determined as having content, the service control unit 617 of the mobile tracker node 600 sends the home super peer node 500 a request to perform super peer handover (S419).

The home super peer node 500 hands over the content transmission rights to the visiting super peer node 500 (S421). At this point, information about the mobile peer node and a peer list containing content information are transmitted as well so that the visiting super peer node 500 can download content based on this information and transmit it to the mobile peer node 400.

Moreover, once the content transmission rights are handed over, the content that has been already downloaded to the home super peer node 500 but not transmitted yet to the mobile peer node 400 can be transmitted, too.

Then, the visiting super peer node 500 transmits the content handed over to itself to the mobile peer node 400 (S423).

Figure 8:
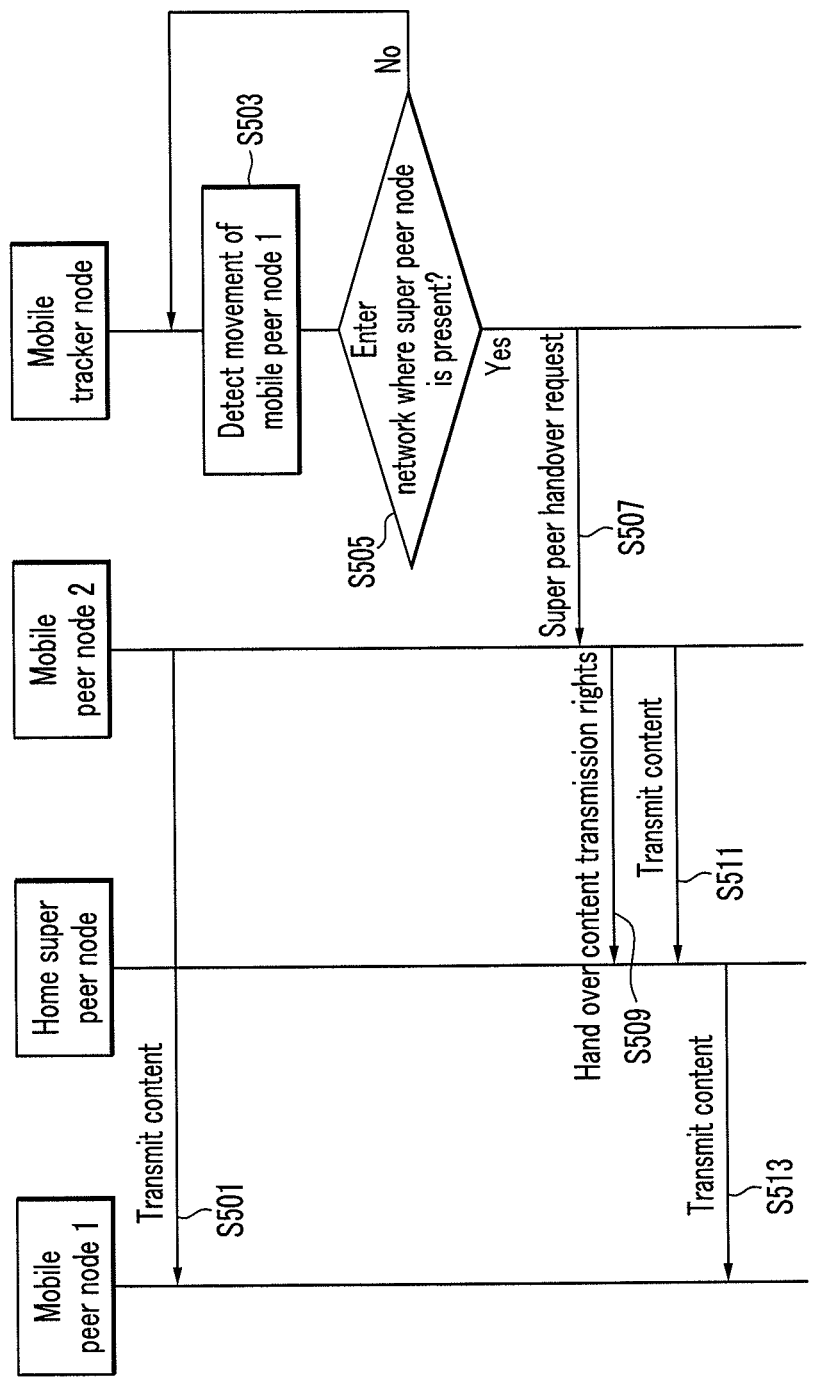
FIG. 8 is a flowchart showing a method for controlling a content transmission path according to another exemplary embodiment of the present invention.

FIG. 8 is a flowchart showing a method for controlling a content transmission path according to another exemplary embodiment of the present invention.

Referring to FIG. 8, a content transmission peer is a mobile peer node. A content receiving mobile peer node 400 is referred to as mobile peer node 1, and a content transmission peer is referred to as mobile peer node 2.

While mobile peer node 1 is receiving content from mobile peer node 2 (S501), the service control unit 617 of the mobile tracker node 600 detects a movement of mobile peer node 1 (S503).

Then, the service control unit 617 of the mobile tracker node 600 to determines whether mobile peer node 1 has entered the network where the super peer node 500 is present (S505). That is, the service control unit 617 determines whether the super peer node exists or not in the wireless access network 100 to which mobile peer node 1 is connected by referring to the peer locality information DB 607 and the super peer information DB 609.

If mobile peer node 1 has not entered the network where the super peer node 500 is present, the step S503 is performed again.

On the contrary, if mobile peer node 1 has entered the network where the super peer node 500 is present, the service control unit 617 of the mobile tracker node 600 sends a super peer handover request to mobile peer node 2 (S507). Information on mobile peer node 2 can be checked in the meta information DB 601.

Then, mobile peer node 2 hands over the content transmission rights to the super peer node 500 requested in the step S507 (S509). At this point, information on mobile peer node 1 is transmitted as well.

Afterwards, mobile peer node 2 transmits content not to mobile peer node 1 but to the super peer node 500 (S511). Then, the super peer node 500 transmits the content received in the step S511 to mobile peer node 1 (S513).

Meanwhile, the P2P content transmission path can be changed by taking into account inter-node distance and traffic condition, which will be hereinafter explained with reference to FIGS. 9 and 10.

Figure 9:
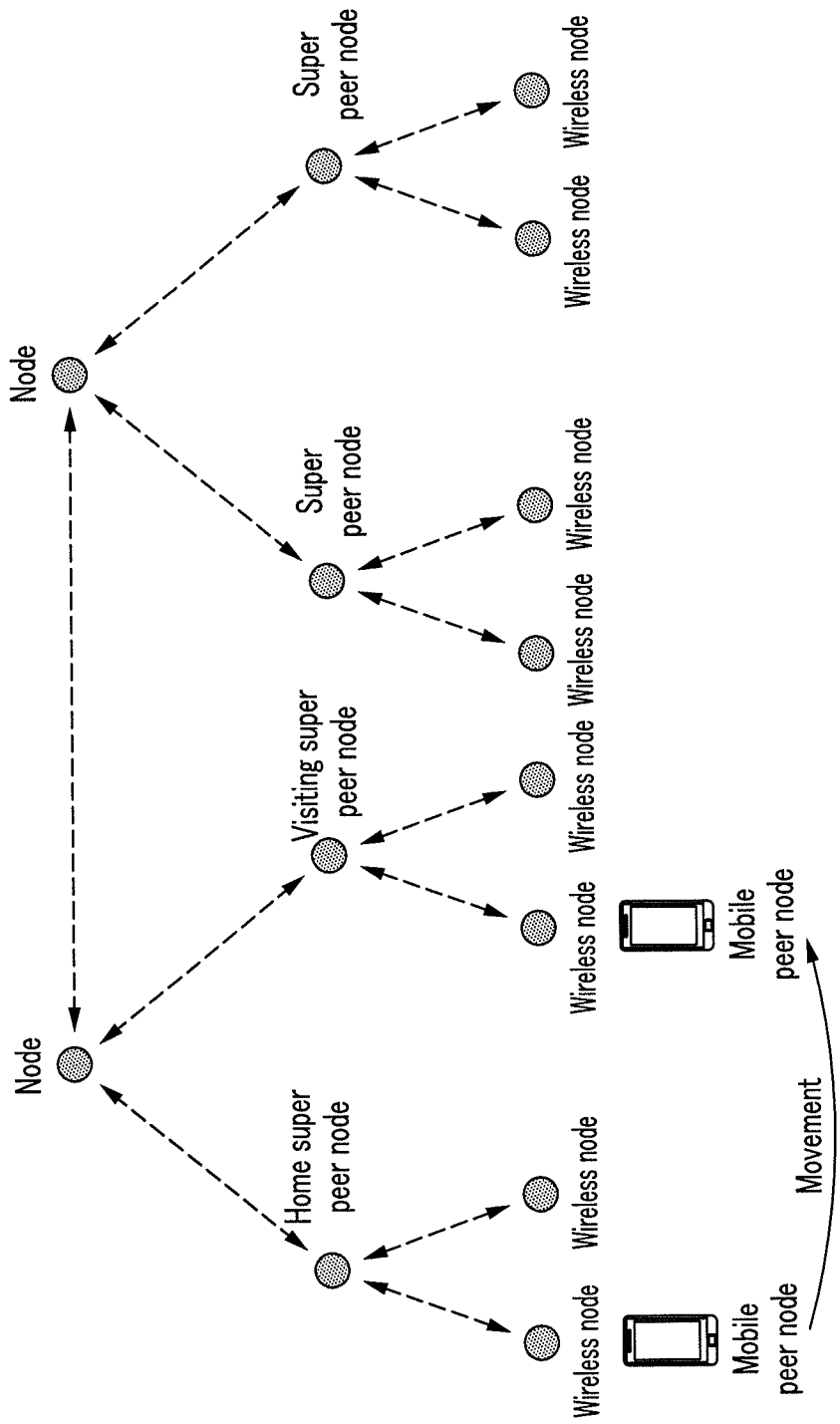
FIG. 9 is a view showing a mobile P2P content transmission path according to an exemplary embodiment of the present invention.

FIG. 9 is a view showing a mobile P2P content transmission path according to an exemplary embodiment of the present invention. FIG. 10 is a flowchart showing a method for controlling a content transmission path according to still another exemplary embodiment of the present invention.

First, referring to FIG. 9, an arbitrary wireless access network 100 to which the mobile peer node 400 is connected includes a plurality of wireless nodes, super peer nodes, and nodes.

As used herein, the plurality of wireless nodes indicate base stations, which refer to RAS (remote access services) in a WiBro network, Node-B in a WCDMA network, and AP (Access Point) in a WiFi network.

The nodes refer to ACR (Access Control Router), an edge router, SGSN, GGSN, and so on.

In this way, a plurality of wireless nodes are present under a single super peer node, and nodes are present over the super peer node.

In this case, a mobile peer node connected to a certain wireless node may be moved and connect to another wireless node. As used herein, the super peer node connected to the wireless node before movement is referred to as the home super peer node, and the super peer node connected to the wireless node after movement is referred to as the visiting super peer node.

A method of path control when the mobile peer node 400 has moved will be described below.

Figure 10:
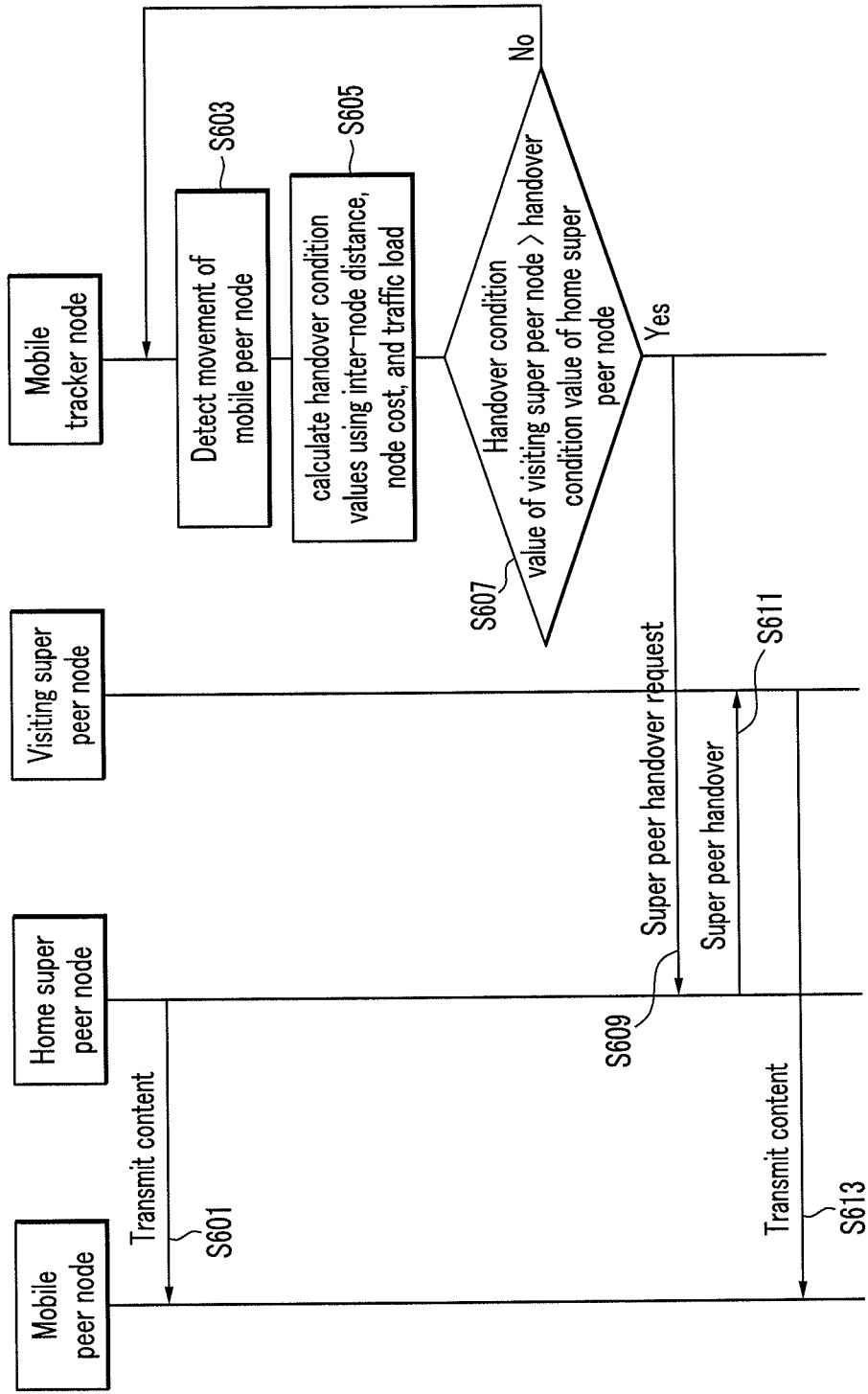
FIG. 10 is a flowchart showing a method for controlling a content transmission path according to still another exemplary embodiment of the present invention.

Referring to FIG. 10, while the mobile peer node 400 is receiving content from the home super peer node 500 (S601), the service control unit 617 of the mobile tracker node 600 detects a movement of the mobile peer node 400 (S603). The movement detection is identical to that of FIGS. 7 and 8.

The service control unit 617 of the mobile tracker node 600 calculates the handover condition values of the home super peer node 500 and the visiting super peer node 500 by the following Equation 1 (S605).

$$T = \sum_i (D_i \times C_i) - (1-L)/\alpha \qquad \text{(Equation 1)}$$

where D represents the distance between the nodes present on the transmission path of the content received by the mobile peer node 400.

C represents the cost of the nodes. The node cost mainly includes the cost of network constituent elements such as the cost of cable between the nodes. That is, the node cost represents the costs (CAPEX) of network constituent elements present on a network path and operating costs (OPEX), both required for mobile P2P traffic transfer.

L represents the traffic load of wireless nodes (to be described in FIG. 9) present on the transmission path. The traffic load is stored in the access network traffic information DB 605.

Referring to FIG. 9, D of the handover condition value of the home super peer node includes the distance between the home super peer node and the wireless nodes and the distance between the wireless nodes and the mobile peer node 400. C includes the cost of the home super peer node and the cost of the wireless nodes. L includes the traffic load of the home super peer node and the traffic load of the wireless does.

Moreover, D of the handover condition value of the visiting super peer node includes the distance between the visiting super peer node and the wireless nodes and the distance between the wireless nodes and the mobile peer node 400. C includes the cost of the visiting super peer node and the cost of the wireless nodes. L includes the traffic load of the visiting super peer node and the cost of the wireless nodes.

The service control unit 617 of the mobile tracker node 600 determines if the handover condition value of the visiting super peer node is higher than the handover condition value of the home super peer node by comparing the handover condition values calculated in the step S605 (S607).

If the handover condition value of the visiting super peer node is determined to be higher than the handover condition value of the home super peer node, the service control unit 617 of the mobile tracker node 600 sends the home super peer node 500 a request to perform super peer handover (S609).

Then, the home super peer node 500 performs super peer handover to the visiting super peer node 500 (S611), and the visiting super peer node 500 transmits content to the mobile peer node 400 (S613). Here, the steps S609 to S613 are identical to the steps S419 to S423.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| 100: wireless access network | 101, 201, 301: edge router |
| 103: base station | 105: EMS |
| 107: AP | 200: dedicated wired network |
| 203: core router | 205: traffic monitoring device |
| 300: Internet network | 303: tracker node |
| 305: peer node | 400: mobile peer node |
| 500: super peer node | 501: routing unit |
| 503: content transmission/reception control unit | |
| 505: content reception unit | |
| 507: content transmission unit | 509: content DB |
| 511: path control unit | 600: mobile tracker node |
| 601: meta information DB | 603: terminal status information DB |
| 605: access network information DB | 607: peer locality information DB |
| 609: super peer information DB | 611: mobile peer management unit |
| 613: terminal status monitoring unit | |
| 615: network traffic monitoring unit | |
| 617: service control unit | |

What is claimed is:

1. A mobile peer-to-peer (P2P) system comprising:
a mobile tracker node that is located in a dedicated wired network operating in conjunction with an interne network to which a plurality of peer nodes are connected, manages information of a plurality of mobile peer nodes connected to a wireless access network, and transmits, to the mobile peer nodes, a peer list containing information on one or more peer nodes having the content queried by the plurality of mobile peer nodes, the one or more peer nodes comprising the mobile peer nodes and the peer nodes on the internet network; and
a super peer node that is connected to the mobile tracker node via wires, located for each wireless access network, forwards a content query received from the mobile peer nodes to the mobile tracker node, and receives the queried content from the peer nodes in the peer list received from the mobile tracker node and transmits the queried content to the mobile peer nodes,
wherein the mobile tracker node comprises:
a network traffic monitoring unit that monitors network traffic in conjunction with the wireless access network to which each of the plurality of mobile peer nodes is connected and the internet network; and
a service control unit that creates the peer list by selecting one or more peer nodes having the queried content and belonging to a network which is determined from among the wireless access network and the internet network, the determined network being determined based on whose network traffic meets a defined condition,
wherein the mobile tracker node further comprises:
a terminal status monitoring unit that is provided with the peer list and operates in conjunction with the wireless access network to which a content receiving mobile peer node is connected so as to monitor the status of the mobile peer node, the status comprising information about the power on/off of the mobile peer node and the connection status of the mobile peer node; and
the service control unit that sends a content storage request to the super peer node when the status of the mobile peer node reported from the terminal status monitoring unit is a content unreceivable state, and
the super peer node comprises:
a content transmission/reception control unit that, upon receipt of the content storage request from the service control unit, stops content transmission to the mobile peer node and stores the content received from the peer nodes in the peer list; and
a content database (DB) that stores the received content, and
wherein, when the status of the mobile peer nodes has changed to a content receivable state, the service control unit sends a content transmission resume request to the super peer node, and
upon receipt of the content transmission resume request from the service control unit, the content transmission/reception control unit extracts the content stored in the content DB and transmits the same to the mobile peer node.

2. The system of claim 1, wherein the service control unit selects one or more peer nodes listed in preset content transmission priority information from among the peer nodes having the queried content, and
the content transmission priority information comprises priority information of mobile peer nodes in an ad hoc network, which have the highest priority, the super peer node located in the wireless access network to which the mobile peer node that has queried the content is connected, the peer nodes belonging to the internet network, mobile peer nodes whose connected wireless access network is a wireless local area network (LAN), and mobile peer nodes connected to a wireless access network with a network load under a defined threshold, which are listed in descending order.

3. The system of claim 1, wherein the mobile tracker node further comprises:
- a peer locality information DB that stores locality information of each of the plurality of mobile peer nodes obtained through the wireless access network; and
- the service control unit that, upon detecting that the mobile peer node receiving the queried content has moved by searching the peer locality information DB, compares the inter-node distance, node cost, and network traffic between the nodes present in the reception path of the queried content and the nodes present in the content path of the new wireless access network, and when the comparison result shows that the new wireless access network is better, the content path of the queried content changes to the content path of the wireless access network,
- wherein, upon receipt of a super peer handover request from the service control unit, the super peer node hands over the content transmission rights to the super peer node of the new wireless access network.

4. The system of claim 1, wherein the mobile tracker node further comprises:
- a peer locality information DB that stores locality information of each of the plurality of mobile peer nodes obtained through the wireless access network; and
- the service control unit that, upon detecting that the mobile peer node receiving the queried content has moved to an ad hoc network by searching the peer locality information DB, sends a super peer handover request to the super peer node, and when the mobile peer node, connected to the wireless access network with no super peer node, has moved to a wireless access network with a super peer node while receiving the queried content from another mobile peer node, sends a super peer handover request to the another mobile peer node,
- the super peer node that hands over the content transmission rights to the ad hoc network in response to the super peer handover request from the service control unit, or upon receipt of the super peer handover (takeover) request from the another mobile peer node, receives the queried content from the another mobile peer node and forwards the same to the mobile peer node.

5. A mobile peer-to-peer (P2P) service method, the method comprising:
- a mobile tracker node's registering information received from a plurality of mobile peer nodes connected to a wireless access network, the mobile tracker node being located in a dedicated wired network operating in conjunction with an interne network to which a plurality of peer nodes are connected;
- providing the plurality of mobile peer nodes with information on a super peer node located in the wireless access network and connected via wires to the mobile tracker node;
- receiving, from the super peer node, a content query transmitted by the plurality of mobile peer nodes;
- creating a peer list containing information on one or more peer nodes having the queried content based on the received information,
- transmitting the peer list to the super peer node, the one or more peer nodes comprising the mobile peer nodes and the peer nodes on the internet network,
- monitoring the status of the mobile peer node, the status comprising information about the power on/off of the mobile peer node and the connection status of the mobile peer node;
- sending a content storage request to the super peer node when the status of the mobile peer nodes is a content unreceivable state; and
- continuously monitoring the status of the mobile peer node, and when the status of the mobile peer node has changed to a content receivable state, sending a content transmission resume request to the super peer node,
- wherein, in the transmitting, the peer list is created by selecting one or more peer nodes belonging to a determined network from among the wireless access network, to which each of the mobile peer nodes is connected, and the internet network, the determined network being determined based on whose network traffic meets a defined condition, and
- wherein, upon receipt of the content storage request, the super peer node is configured to stop content transmission to the mobile peer node and store the content received from the peer nodes in the peer list.

6. The method of claim 5, wherein, in the transmitting,
- the one or more peer nodes are selected from among mobile peer nodes in an ad hoc network, the super peer node located in the wireless access network to which the mobile peer node that has queried the content is connected, the peer nodes belonging to the internet network, mobile peer nodes whose connected wireless access network is a wireless local area network (LAN), and mobile peer nodes connected to a wireless access network with a network load under a defined threshold.

7. The method of claim 5, further comprising,
after the transmitting:
- upon detecting that the mobile peer node has moved, calculating respective handover condition values based on the inter-node distance, node cost, and network traffic of the nodes present on the content transmission path of the wireless access network connected before the movement and the nodes present on a predicted content transmission path of the wireless access network connected after the movement; and
- when the handover condition value of the wireless access network connected after the movement is lower by comparing the respective handover condition values, sending the super peer node located in the wireless access network connected before the movement a request to hand over the content transmission rights to the super peer node located in the wireless access network connected after the movement.

8. The method of claim 5, further comprising,
after the transmitting:
- upon detecting the mobile peer node's movement to an ad hoc network during reception of the queried content from the super peer node by searching the peer locality information database (DB), sending a super peer handover request to the super peer node, and
- when the mobile peer node, connected to the wireless access network with no super peer node, has moved to a wireless access network with the super peer node during reception of the queried content from another mobile peer node, sending a super peer handover request to the another mobile peer node.

9. A mobile peer-to-peer (P2P) service method, the method comprising:
- a super peer node's receiving a content query from a plurality of mobile peer nodes and forwarding the content query to a mobile tracker node, the super peer node being connected via wires to the mobile tracker located in a dedicated wired network operating in conjunction with an internet network to which a plurality of peer nodes are connected, and the plurality of mobile peer nodes being connected to a wireless access network;

receiving, from the mobile tracker node, a peer list containing information on one or more peer nodes having the queried content, the one or more peer nodes comprising the mobile peer nodes and the peer nodes on the internet network;

receiving the queried content from a certain peer node listed in the peer list and transmitting the queried content to the mobile peer nodes, receiving a super peer handover request from the mobile tracker node;

requesting the super peer node of a wireless access network, to which the mobile peer node included in the super peer handover request has moved, or a mobile peer node within an ad hoc network, to which the mobile peer node has moved, to transmit the content being transmitted to the mobile peer node;

after the transmitting, when the mobile peer node goes into a content unreceivable state, stopping the transmission of the queried content to store the queried content in response to a request from the mobile tracker node; and after the storing, when the mobile peer node goes into a content receivable state, transmitting the content stored in response to the request from the mobile tracker node to the mobile peer node, wherein, in the transmitting, the peer list is created by selecting one or more peer nodes belonging to a determined network from among the wireless access network, to which each of the mobile peer nodes is connected, and the internet network, the determined network being determined based on whose network traffic meets a defined condition, and wherein the mobile tracker node is configured to monitor a status of the mobile peer node, the status comprising information about a power on/off of the mobile peer node and a connection status of the mobile peer node.

* * * * *